June 6, 1950 J. M. KUHLIK 2,510,475
REEL
Filed Aug. 17, 1946
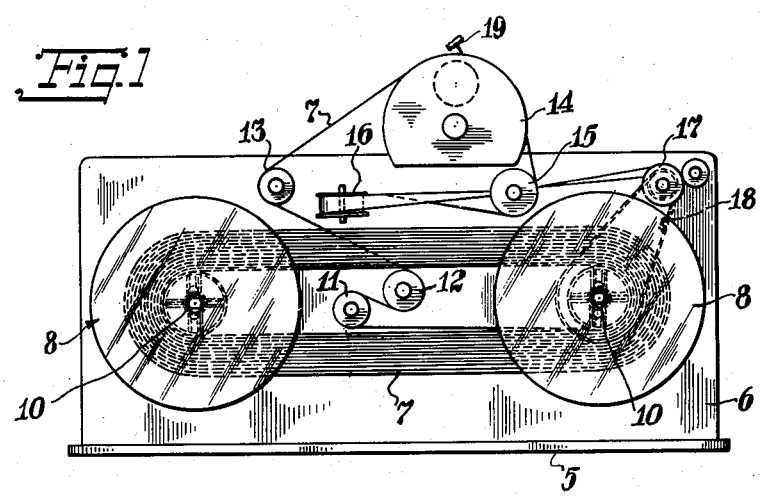
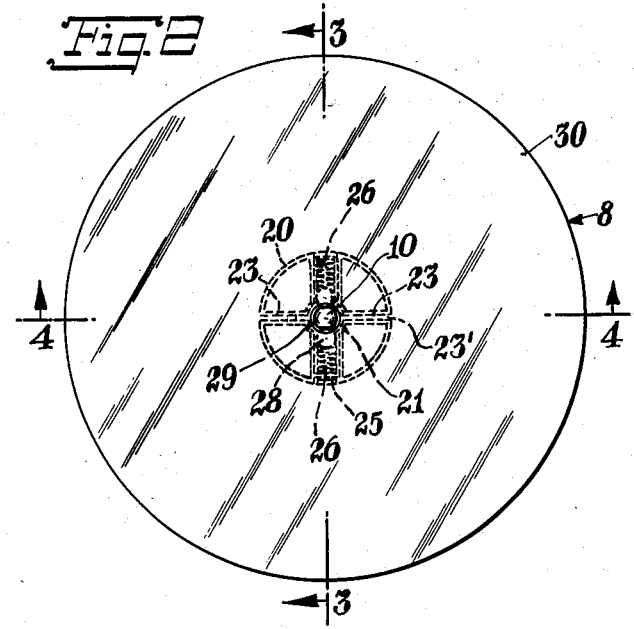
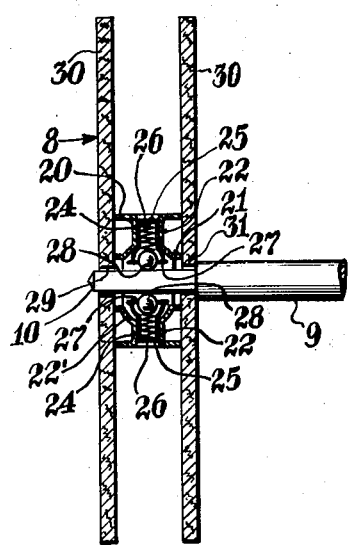
INVENTOR.
Jacob M. Kuhlik
BY
Edw. S. Higgins
Attorney Patented June 6, 1950

2,510,475

UNITED STATES PATENT OFFICE 2,510,475

REEL

Jacob M. Kuhlik, Brooklyn, N. Y., assignor to Hattie B. Kuhlik, Sea Gate, N. Y.

Application August 17, 1946, Serial No. 691,234

1 Claim. (Cl. 242—70)

This invention relates generally to recording and reproducing machines and more particularly to improved reel members and means for detachably mounting a reel member on its supporting shaft.

Heretofore it has been necessary in mounting a reel on its shaft to fit a particular portion of the reel, such as a key for example, upon a particular portion of the shaft, for example, the keyway of the shaft and then push the reel into position on the shaft. In other instances, locking means are provided on the outer end of the shaft in order to keep the reel from slipping off of the shaft.

It is a primary object of the present invention to provide improved means whereby the reel may be readily mounted on its shaft in proper position without any mechanical guiding means, and held thereon.

Another object is to provide means whereby the reel automatically finds and maintains its axial position without the use of special mechanical means.

Another object is to provide means for readily mounting and demounting the reel on its shaft.

A specific object is to provide a plastic transparent reel whereby the condition of the coil of film may be seen at all times.

Another object is to provide means of this kind that are simple, inexpensive and efficient in use.

Other objects and advantages of the present invention will be apparent from the description thereof to follow taken in connection with the accompanying drawings in which:

Fig. 1 is a front view of a sound recording and reproducing machine embodying the present invention.

Fig. 2 is an enlarged plan view of a reel member showing the improved means for mounting it on a shaft.

Fig. 3 is a cross-sectional view taken on the plane of the line 3—3 of Fig. 2.

Fig. 4 is a cross-sectional view taken on the plane of the line 4—4 of Fig. 2.

Referring to the drawing in particular, the sound recording and reproducing machine consists of a base 5 on which is mounted a panel member 6 for supporting the various units of the machine.

The machine illustrated is adapted to use an endless film band 7 directly supported by spaced reels 8 adjacent the ends of the panel. Each reel is mounted on a rotatable shaft 9 which is rotated by suitable mechanism (not shown). Each shaft is circular in cross-section with a flattened protruding outer end portion 10 upon which the reel is mounted.

Mounted on the panel between the reels are idler rollers 11 and 12 and another roller 13 is mounted adjacent the top of the panel and to one side of the center thereof. A substantially circular anvil or base 14 is mounted to one side of the center and adjacent the top edge of the panel so that the circular top edge thereof protrudes above the edge of the panel and above the roller 13. An idler roller 15 is mounted on the panel to the side of the anvil opposite the roller 13. Rollers 11, 12 and 13, anvil 14 and roller 15 are so positioned that their peripheries are on the same plane, which plane is disposed rearwardly of the plane of the reels 8.

A roller 16 is mounted on a bracket on the panel on the side of the anvil opposite to the roller 15 and this roller is disposed with its axis transversely disposed relative to the axis of roller 15. On the panel at the side of the anvil 14 opposite to that of roller 16 is a roller 17, the periphery of which latter roller is positioned in the same vertical plane as the plane of the reels 8. The roller 17 is driven by mechanism not shown and the drive from roller 17 is carried to the right-hand reel 8 by a chain 18.

The film 7 passes around the reels and rollers as shown and over the anvil 14 where it is engaged by the stylus 19 of a sound box (not shown) in the usual manner for recording and reproducing purposes.

The present invention is concerned with the construction of the reel and its mounting on its shaft 9. This reel comprises a hub portion for supporting the film consisting of an outer annular member 20 and an inner annular member 21. The annular members are connected by opposite radially disposed integral tubular portions 22 and by flat connecting walls 23 with a slot 23' in each wall for receiving the end of a film. The inner annular member is flared as indicated at 22' where it joins the tubular portion. In each of the tubular portions is a sleeve member 24 having one end closed to provide a seat 25 for one end of a coil spring 26 mounted therein and having its other end open and cupped as indicated at 27 to receive a ball member 28 seated on the other end of the coil spring. The opposed ball members protrude into the central opening 29 in the hub portion. Suitably fastened to the side edges of the outer and inner annular members of the hub portion are walls or disc members 30 each being provided with a central opening 31 in alignment with the central opening 29 in the hub portion. The hub portion and disc members are formed of plastic material which is preferably transparent.

To place the reel in operative position on the shaft 9, the user positions it so that the balls 28 are on opposite sides of the flattened portion 10 of the shaft and then shoves it inwardly over said flattened portion until the inner wall 30 of the reel engages the shoulder on the shaft as shown in Fig. 3. This inward movement causes the flattened portion of the shaft to move the balls apart against the action of the springs 26. When in this position as shown in Fig. 3, the balls are pressed by the springs into gripping engagement with the flattened portion of the shaft thereby holding the reel on the shaft for rotation with the shaft and preventing accidental displacement or slippage of the reel on the shaft. The reel can very easily be pulled off of the shaft when outward pressure is exerted thereupon as will be understood.

The plastic walls of the reel provide the necessary rigidity without the necessity of any ribs or other expedients for this purpose. Furthermore the transparent walls permit a view of the coil of film whereby its condition can be seen at all times and under all conditions of use. The smooth inner surfaces of the walls of the reel permit the film to travel without undue friction.

I claim:

In combination with film handling apparatus having a rotatable drive shaft with a solid flattened end portion, a film supporting reel member having a hub portion, said hub portion having an outer annular member and an inner annular member spaced therefrom, opposed coil springs radially supported between said annular members and ball members seated on the ends of said springs and normally urged by said springs into engagement with the flattened end portion of the shaft for detachably supporting the reel member on the shaft.

JACOB M. KUHLIK.

REFERENCES CITED

The following references are of record in the file of this patent:

UNITED STATES PATENTS

| Number | Name | Date |
|---|---|---|
| 2,220,610 | Miller | Nov. 5, 1940 |
| 2,397,362 | Markle | Mar. 26, 1946 |